United States Patent [19]

Caris

[11] 4,420,054
[45] Dec. 13, 1983

[54] WEIGHING APPARATUS WITH OVERLOAD PROTECTION FOR OFF-CENTER LOADING

[75] Inventor: Richard F. Caris, Scottsdale, Ariz.

[73] Assignee: Interface, Inc., Scottsdale, Ariz.

[21] Appl. No.: 314,166

[22] Filed: Oct. 23, 1981

[51] Int. Cl.³ .................. G01G 23/02; G01G 3/08
[52] U.S. Cl. .................................. 177/154; 177/229
[58] Field of Search .................. 177/154, 156, 229

[56] References Cited

U.S. PATENT DOCUMENTS

| | | | |
|---|---|---|---|
| 3,354,710 | 11/1967 | Johnson | 177/229 X |
| 4,143,727 | 3/1979 | Jacobson | 177/229 X |
| 4,150,729 | 4/1979 | Ormond | 177/229 X |
| 4,278,139 | 7/1981 | Caris | 177/154 |

Primary Examiner—George H. Miller, Jr.
Attorney, Agent, or Firm—Cates & Roediger

[57] ABSTRACT

Weighing apparatus utilizing a load cell wherein overload protection is provided that is external to the load cell. The weighing platform is attached to the load receiving surface of the load cell by a number of outwardly extending arms. Two sets of stops are provided adjacent the load cell and one set is provided at the periphery of the weighing platform.

1 Claim, 2 Drawing Figures

WEIGHING APPARATUS WITH OVERLOAD PROTECTION FOR OFF-CENTER LOADING

BACKGROUND OF THE INVENTION

This invention relates to electronic weighing apparatus of the type utilizing a strain gage load cell as the active element which provides the electrical signal indicative of the weight of an article.

Recent advances in the force measurement field have taken place primarily due to the improvement in the operating characteristics of the strain gage load cell. The load cell is a transducer which when subjected to certain forces provides an accurate electrical indication of the force or forces to be measured. These versatile transducers are being utilized in an ever increasing number of applications due to several important operating characteristics including the insensitivity of the load cell to off-center loading.

The ability of the load cell to measure weight directly and accurately has resulted in their use in electronic scales wherein compression loads from the weighing platform are applied to the load receiving surface of the load cell. One advantage to the electronic weighing apparatus is the absence of flexures, pivots and adjustments and, as a result, the weighing platform is directly coupled to the load receiving surface of the load cell.

The weighing platform of the apparatus is normally required to have a large surface area so that bulky articles can be readily accommodated thereon. However, the load receiving surface of a load cell may be less than one square inch so that the weighing platform and the supporting frame therefore extend outwardly a substantial distance from the load cell. The supporting frame for the weighing platform provides the needed support through a number of force translating arms which extend outwardly from the load cell to the peripheral region of the weighing platform.

When the article to be weighed is placed in the central portion of the weighing platform, the load is shared by the supporting arms. To provide protection to the load cell in the situation where the article exceeds the measuring capacity of the load cell, stops have been located near the periphery of the weighing platform so that upon a predetermined deflection by the applied weight the stop limits further deflection.

However, the placement of the article upon the peripheral portion of the weighing platform generally results in an unequal sharing of the force by the supporting arms and in certain situations, one may translate the entire force to the load cell. Consequently, the rated load in this situation results in substantially greater platform deflection than the placement of the rated load in the center of the platform. To provide overload protection for the condition wherein the entire rated load is dropped by the operator at the center of the platform, the gaps between the stops and the underside of the weighing platform are substantially reduced thereby derating the scale.

Further protection for the load cell has been provided by the incorporation of a protective structure within the load cell. This typically is the use of a gapped structure for the cell body with the gap size being determined by the largest static load to be expected. Since the weighing apparatus has been found to experience dynamic loads during operation which are significantly higher than the static protection provided, the failure rate of load cells in weighing apparatus increases. The dynamic condition, wherein an article with the rated capacity of the apparatus is dropped on the weighing platforms, provides a high impulse causing the stress to build quickly and then almost instantaneously reverse subjecting the structure to a load greatly exceeding that of the static load counterpart. Thus, external stops and the derating of the weighing apparatus are normally utilized in combination with the internal protection.

Additional measures taken to decrease the failure rate of load cell weighing apparatus have utilized a stiffer and stronger load cell therein. While this approach has tended to reduce the failure rate, the system is less sensitive to a given load and consequently a lower electrical signal is generated by the commercially available strain gages affixed to a stiffer load cell structure. Since the load cell output signal is in the millivolt range, the lower signal level is undersirable due to the lower signal to noise ratio and the fact that the sensitivity of succeeding electronic devices is normally required to be increased.

It is desired to increase the sensitivity of load cells without requiring the use of internal stop mechanisms contained within the structure of the load cell. Internal stop means normally introduce unwanted and unpredictable variations in the output signals. To enhance sensitivity, load cells are designed to permit increased deflection and to rely on the weighing apparatus to include the external stopping mechanisms for limiting the deflection under different loading conditions.

The optimization of load cell deflection requires consideration of conflicting requirements. As the deflection of the load cell increases, the setting of external overload stop gaps becomes less critical but structural-linearities increase due to the increased torque within the structure. As a result, the sensitivity of the load cell to off-center loading increases. This is similar to the non-linearity in performance exhibited by load cells containing internal gaps for overload protection. Further, the natural frequency of the apparatus decreases as the permitted deflection increases. In industrial environments the unbalanced rotors of electric motors running at 1800 rpm established a predominant resonance frequency of 30 Hz. This factor establishes an upper limit for permissable deflection. Thus, the overload protection provided by a weighing apparatus should enable the mechanical vibrations in the environment to be accounted for while at the same time permitting practical lower limits on deflection.

Accordingly, the present invention is directed to a strain gage load cell weighing apparatus wherein improved overload protection for static and dynamic loading is provided. The overload protection enables the derating of load cell and scale capacity to be substantially reduced and, further, the use of the sensitive measuring instrument itself for overload protection is not required.

BRIEF SUMMARY OF THE INVENTION

The present invention is concerned with electronic weighing instruments wherein a strain gage load cell has the compression loads from a weighing platform applied thereto and provides an electrical output signal which is a measure of the weight of an article on the weighing platform.

The weighing instrument includes a frame member which engages the supporting surface. Load cell means are affixed to the frame member. The means includes a load cell having a first pair of opposing areas to which forces are applied to induce measurable strain therebetween. Also, the load cell contains a second pair of unconstrained opposing areas therein. One of the first pair of opposing areas is affixed to the frame and the other of the pair faces upward. A weighing platform having first and second surfaces overlies the load cell means and is coupled to the upward facing surface by intermediate support means.

The load cell means is substantially smaller than the weighing platform and is centrally located thereunder. A first overload protective means is connected to the frame member and extends upwardly toward the second surface of the weighing platform and is spaced from the platform and the intermediate support means by a first distance. The first means is located on the frame member and spaced from the load cell means. In addition, a second overload protective means is connected to the frame member proximate to the load cell means and extends upwardly toward the second surface of the weighing platform. The second means includes a plurality of stop members which are spaced a second distance from the peripheral portion of the platform and the intermediate means attached thereto.

In addition to the overload protective means, a first stop means is affixed to the frame and is spaced from one of said unconstrained areas of the load cell. A second stop means is mounted on the intermediate support means coupling the weighing platform to the upward facing constrained area of the load cell. The second stop means is spaced from the adjacent unconstrained area of the load cell. The first and second stop means are located in a plane that it is generally orthoganal to a plane containing the second overload protective means. As a result, protection for the load cell by deflection limiting means is provided in each of the four quadrants proximate to the load cell.

The first protective means is spaced a greater distance from the platform and its intermediate support means than the second protective means. The placement of a load on the weighing platform causes a deflection of the platform in a downward direction and for loads centrally located on the weighing platform, the overload protection means is encountered after a deflection equal to the second distance. However, loads applied at the peripheral portion of the weighing platform encounter the first overload protection means after the peripheral portion has been deflected downwardly by the first distance. By utilizing the differently located and spaced stop and protective means, improved static and dynamic overload protection of the load cell is provided.

Since the electronic weighing apparatus utilizing a load cell is often placed in a service area where it is used by a large number of people, the dynamic overload protection which prevents damage to the load cell from an article dropped onto the weighing platform is a significant and necessary requirement for wide scale commercial acceptance.

Further features and advantages of the invention will become more readily apparent from the following detailed description of a specific embodiment of the invention when taken in conjunction with the accompanying drawings.

DESCRIPTION OF THE PREFERRED EMBODIMENT

Figure 1:
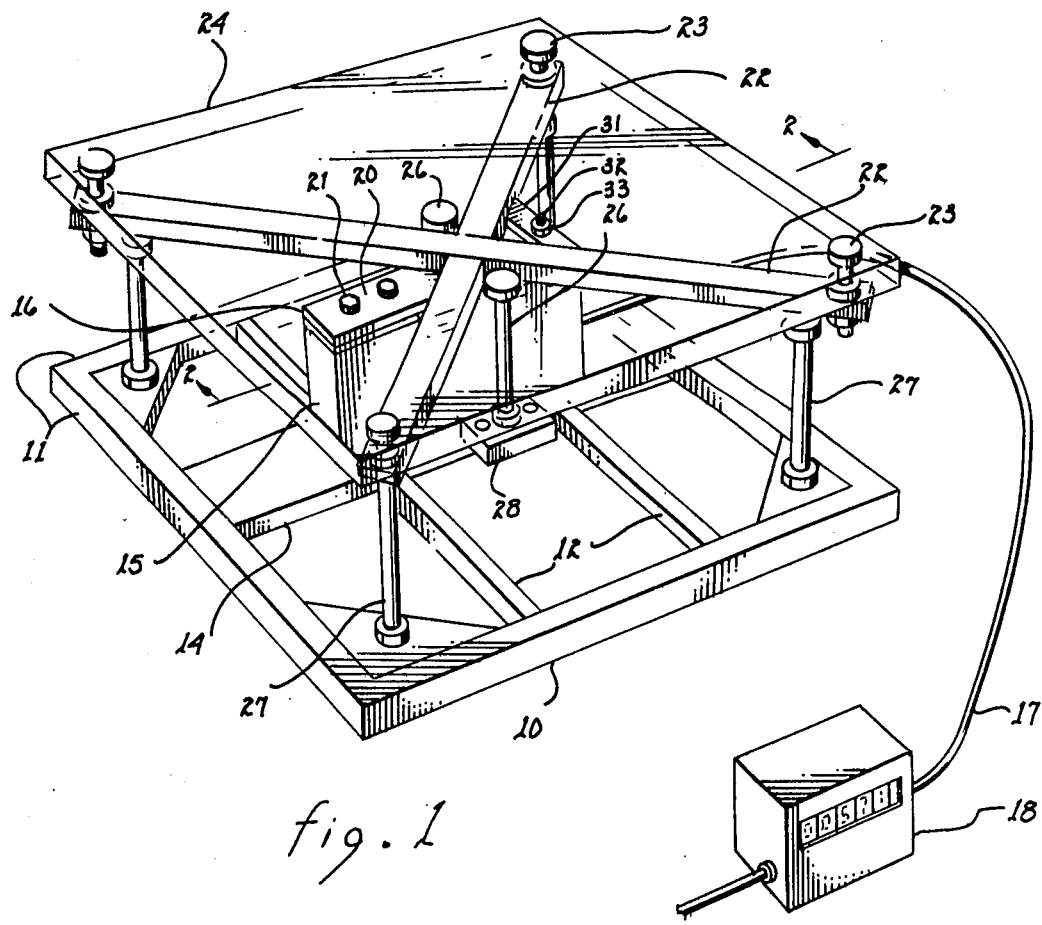
FIG. 1 is a view in perspective of an electronic weighing apparatus utilizing one embodiment of the present invention.

Referring now to the embodiment of FIG. 1, a rectangular frame member 10 is shown formed with edge members 11, central support members 12 and transverse supporting element 14 upon which load cell 15 is affixed.

The frame is adapted to rest on a horizontal supporting surface and may be formed of welded steel components. Near the central portion of supporting element 14, holes (not shown) are provided to permit the load cell 15 to be fastened to the frame member 10.

Load cell 15 contains strain gages internally mounted on the structure in a manner so as to be responsive to the induced strain resulting from a compression force applied between the raised portions of its top and bottom surfaces. The bottom surface is referred to herein as the mounting surface and a raised surface portion is provided at one corner region of the load cell for affixation to element 14. The diagonally opposing portion of the upper surface of the load cell is referred to herein as the load receiving surface and contains raised portion 16 having threaded holes therein. Strain gage load cells of this type are commercially available and further description of the construction of the cell is not necessary for the present invention. One strain gage load cell tested and operated successfully with this invention is the Single Point Load Cell, having a rated capacity of 25 lbs., manufactured and sold by Interface, Inc., Scottsdale, Ariz.

The electrical signal from the internally mounted strain gages is supplied via conductor 17 to a digital indicating device 18 which is coupled to an external power supply. This signal in combination with indicating device 18 provides a direct readout of an article being weighed.

Figure 2:
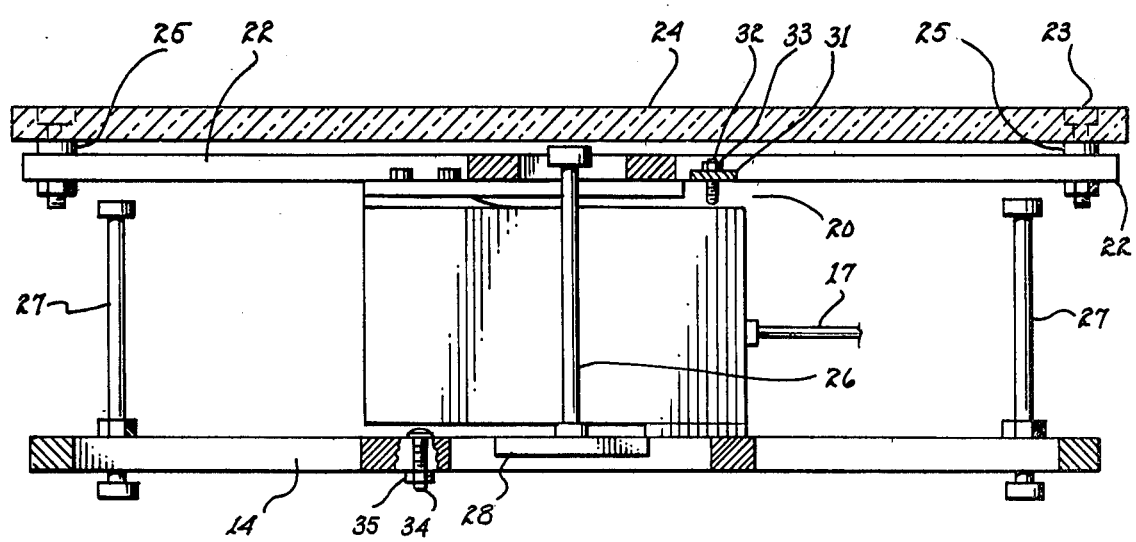
FIG. 2 is a side view in section of the embodiment of FIG. 1 taken along line 2—2.

A flat plate 20 is secured to the raised load receiving surface of load cell 15 by screws 21 and extends across a major portion of the top surface thereof. Four outwardly extending arms 22 are affixed to plate 20 at a point on the primary axis of the load cell and extend out toward the corners of the frame member in the embodiment of FIG. 1. The extending arms are each provided with a hole at their outer end for receiving bolts 23. The weighing platform 24 is secured to the arms 22 by the bolts and a resilient spacer 25 is interposed therebetween to insure that the platform is secured at its peripheral region and does not contact the outwardly extending arms 22 directly as noted from FIG. 2. In addition, the resilient spacers 25 provide a degree of shock absorbence to the structure.

A stop support member 31 is affixed to two adjacent outwardly extending arms 22 and contains a threaded hole into which a threaded stop bolt 32 is inserted and held in place by locking nut 33. The stop support member 31 is positioned so as to be in overlying relation to the adjacent unconstrained portion of the top surface of the load cell. The stop bolt is inserted so as to be adjustably spaced from the top surface and thereby limit deflection of the apparatus in this region.

Also, a second stop element is provided for restricting deflection of the load cell at the opposing unconstrained surface next to the raised mounting surface at the bottom of the load cell. The stop element includes adjustable stop bolt 34 threaded into the frame 14 and locking nut 35. The first and second stops reside in a plane that contains the primary axis of the load cell and is orthogonal to a plane containing the two upwardly extending stops 26.

The supporting element 14 is provided with tab members 25 located on opposite sides of the load cell 15. The second overload protective means includes the two stops 26 which extend upwardly from each tab member 28 toward the underside of the weighing platform. The stops are located proximate to the portion of load cell 15 having arms 22 attached thereto. Thus, the stops 26 are located near the geometric center of the weighing platform in quadrants adjacent the stops formed by limiting bolts 32 and 34. The stops 26 are spaced from the underside of the platform by a distance which is a function of the number of supporting arms 22, the rated capacity of the load cell and the material used for the weighing platform and the supporting arms. The stops formed by bolts 32 and 34 are adjustable with the gaps of spacings from the load cell body being set based on the rating of the load cell. In practice, the gap at the top of the load cell is slightly larger to accommodate deflection in the arms 22.

The placement of a load on the central region of the weighing platform results in the translation of the compression force via the arms to the load receiving surface of the cell 15. The weight of the load and the speed with which it encounters the platform determine the amount of downward deflection of the platform. Thus, the distance which is between stops 26 and the platform along with the deflection limiting of the bolts 32 and 34 is such that the weighing platform contacts a stop prior to exceeding the permissible deflection and stress level that cell 15 can withstand. While static limitations are normally provided by the manufacturer, the dynamic situation wherein the user drops a load on the platform is most important. It has been found that the limiting action of bolts 32 and 34 is utilized for loads placed in the approximate plane containing these limiting bolts as well as for heavy loads at the center of the weighing platform.

The apparatus is provided with first protective means which includes stop 27 affixed to the edge members 11 and extending upwardly toward the extending arms 22 which are fastened to the underside of the weighing platform. The stops 27 are spaced from the adjacent extending arms. In the embodiment shown utilizing a rigid weighing platform, this distance is greater than the spacing distance of stops 26. Since the weighing platform is likely to have a rated load dropped on the platform within its peripheral corner regions, the stops 27 are located to limit the deflection of these regions. However, the force is translated primarily through a single arm 22 to the load cell 15 and the deflection for a given load in this embodiment is greater than a centrally applied load. Consequently, this distance in the embodiment shown is about four times greater than the spacing distance of the central limiting elements. In embodiments utilizing a different number of supporting arms and different materials for construction, the relationship between the distances is varied to provide the desired overload protection for both central and peripheral loading.

In operation, the central stops 26, along with bolts 32 and 34, permit the load cell to be protected in the case of centrally applied overloads while enabling the peripheral stops 27 to be spaced further from the contact area of the extending arms or weighing platform so that rated loads can be accommodated across the weighing platform. Also, the first stops 26 are found to provide additional protection to the load cell in the case of the high impact load arriving at or near the peripheral portion of the weighing platform since the deflection of the platform causes the central portion of contact stops 26 in addition to being limited by a contacting of the second stops 27. This dynamic protective aspect of the invention is significant in view of the face that high impact loads provide a stress that greatly exceeds that of the static load counterpart. This is due to the fact that the acceleration of the platform increases rapidly and then drops to zero almost instantaneously thereby providing a reverse stress of equivalent magnitude.

The stops 26, 27 and bolt 34 are preferably mounted in threaded receiving holes in the frame so that the spacing to the undersurface of the weighing platform can be readily adjusted. Bolt 32 is adjustable in stop support member 31. Also, the weighing platform may be provided with a frame member to provide increased rigidity. In the embodiment shown in FIGS. 1 and 2, the stops 27 are positioned to contact the extending arms 22 with the distance therebetween determining the limit of movement of the weighing platform. However, other embodiments may be utilized wherein the stops 27 directly contact the weighing platform with the spacing therebetween being that of the embodiment shown.

While the above description has referred to a specific embodiment of a measuring instrument utilizing the invention it is recognized that variations and modifications may be made therein without departing from the spirit and scope of the invention.

I claim:
1. A weighing instrument which comprises:
 (a) a planar frame for engaging a support surface, said frame having a central area for receiving a load cell thereon;
 (b) a load cell having a first end including a raised mounting surface and a second opposing end including raised load receiving surface, a portion of said mounting surface engaging the central area of said frame;
 (c) a first adjustable stop affixed to the central area of said frame proximate to the first end of said load cell;
 (d) a large area weighing platform having a load receiving upper surface;
 (e) a plurality of radially extending support arms coupled between the load receiving surface of said load cell and the outer peripheral region of the weighing platform;
 (f) a support member extending between two adjacent support arms and overlying a portion of the second end of said load cell;
 (g) a second adjustable stop affixed to the support member proximate to the second end of said load cell, said first and second stops residing within a plane orthogonal to the weighing platform;
 (h) a pair of overload protectors affixed to the central area of said frame and extending upwardly towards and being spaced from said weighing platform to limit downward movement thereof to a predetermined distance, said first pair residing within a plane which is orthogonal to the weighing platform and to the plane of said first and second stops, each stop and overload protector residing within adjacent quadrants about the load cell to thereby protect said cell from centrally located excess loading of the weighing platform; and
(i) peripheral overload protectors affixed to said frame and extending upwardly towards and being vertically spaced from the peripheral portion of said weighing platform to thereby protect said cell from peripherally located excess loading of the weighing platform.

* * * * *